(12) United States Patent
Sparacin et al.

(10) Patent No.: US 7,336,684 B2
(45) Date of Patent: Feb. 26, 2008

(54) PLANAR MULTIWAVELENGTH OPTICAL POWER SUPPLY ON A SILICON PLATFORM

(75) Inventors: Daniel K. Sparacin, Cambridge, MA (US); Luca Dal Negro, Cambridge, MA (US); Sajan Saini, Somerville, MA (US); Lionel C. Kimerling, Concord, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 180 days.

(21) Appl. No.: 10/902,612

(22) Filed: Jul. 29, 2004

(65) Prior Publication Data

US 2005/0063426 A1 Mar. 24, 2005

Related U.S. Application Data

(60) Provisional application No. 60/491,778, filed on Aug. 1, 2003.

(51) Int. Cl.
 *H01S 3/30* (2006.01)
 *H01S 3/083* (2006.01)
 *G02B 6/28* (2006.01)

(52) U.S. Cl. ............................... 372/6; 372/94; 385/24
(58) Field of Classification Search .................... 372/6, 372/94; 385/24
 See application file for complete search history.

(56) References Cited

U.S. PATENT DOCUMENTS 6,671,426 B2 * 12/2003 Litvin ........................ 385/15
6,831,938 B1 * 12/2004 Gunn, III .................... 372/92
6,845,108 B1 * 1/2005 Liu et al. ...................... 372/20
6,987,913 B2 * 1/2006 Blauvelt et al. .............. 385/50
2002/0191935 A1  12/2002 Gao
2002/0196509 A1  12/2002 Smilanski et al.
2004/0160994 A1 *  8/2004 Zhang ......................... 372/23
2004/0223683 A1 * 11/2004 Block et al. .................. 385/15

FOREIGN PATENT DOCUMENTS

| JP | 03054529 | 3/1991 |
| JP | 5259538 | 10/1993 |
| JP | 08046574 | 2/1996 |

OTHER PUBLICATIONS

"Low-Energy Implanted Si2N4/SiO2/Si Waveguides," Lumholt et al., *Electronics Letters, IEE Stevenage*, vol. 28, n. 24 (Nov. 19, 1992).

"Deep High-Dose Erbium Implantation of Low-Loss Silicon Oxynitride Waveguides," Chelnokov et al. *Electronics Letters, IEE Stevenage*, vol. 30, n. 22 (Oct. 27, 1994).

"Micro-Ring Resonator Channel Dropping Filters," Little et al., *Lasers & Electro-Optics Society Annual Meeting* (1995).

* cited by examiner

*Primary Examiner*—Minsun Harvey
*Assistant Examiner*—Marcia A. Golub
(74) *Attorney, Agent, or Firm*—Gauthier & Connors LLP

(57) ABSTRACT

A microphotonic light source includes an optical pump and a plurality of waveguides that distribute optical pump power of the optical pump. At least one Erbium-doped laser ring is coupled to at least one of the waveguides so as to match the resonance condition of the optical pump.

16 Claims, 8 Drawing Sheets

PLANAR MULTIWAVELENGTH OPTICAL POWER SUPPLY ON A SILICON PLATFORM

PRIORITY INFORMATION

This application claims priority from provisional application Ser. No. 60/491,778 filed Aug. 1, 2003, which is incorporated herein by reference in its entirety.

BACKGROUND OF THE INVENTION

The invention relates to the field of microphotonic light sources, and in particular to a planar multiwavelength optical power supply on a silicon platform.

Photonics technology revolutionized telecommunication systems in the later 1970s with the deployment of low-loss, single mode silica fibers and efficient, double heterostructure, single mode injection lasers. Long haul fiber optic systems were ultimately enabled with the development of erbium-doped fiber amplifiers (EDFA's), operating around the 1.55 µm low-loss fiber communication regime, dubbed the C-band. The EDFA's gain bandwidth is optimal within a 4000 GHz (30 nm) wide spectral window about 1.55 µm, thus permitting the eventual integration of wavelength division multiplexing (WDM) communications in the late 1990s.

Within the microelectronics industry, the continued drive of Moore's Law towards smaller circuit elements and denser chip architecture has now yielded to an intra-chip transmission limitation referred to as the interconnect bottleneck, an RC circuit delay occurring due to the smaller cross-section and closer spacing of conducting metal lines above the integrated circuit chip.

The recent growth of Metropolitan Area Networks (MAN), boosted by the rapid growth of the internet and a resulting demand for higher communication bandwidth, has given impetus to the development of micron-scale integrated photonic devices (microphotonics), creating a new generation range of faster, high yielding, higher functionality complex photonic devices. These micron-scale structures present a convergence of solutions for both the interconnect bottleneck problem, and the MAN requirement of low-cost high volume components.

Si-based microphotonics is a planar waveguide technology, combining all the necessary components for optical signal transmission and computing into a single optical chip, on a silicon wafer platform. These components include, lasers, switches, modulators, detectors, and channel add/drop filters. A significant reduction in cost and system size results from this dense planar integration, where all the optical components with different functionalities can be combined to yield an Integrated Optical Platform (IOP) or Optoelectronic Integrated Circuit (OEIC's) fully compatible with the widespread CMOS silicon microelectronics technology. This compatibility with CMOS technology leverages a powerful degree of planar processing experience in favor of designing high performance photonic structures. Silicon IOP would allow unprecedented information and computing capabilities appealing for a variety of technological markets.

The scientific and technological breakthrough of silicon microphotonics would consist of the demonstration of an efficient, CMOS compatible laser source for the silicon platform, enabling the integration of information processing silicon microelectronics with high bandwith transmitting silicon-based photonic structures. The invention proposed here provides a multi-frequency laser platform operating in the C-band telecommunication window with full CMOS compatibility.

Lasers and optical amplifiers are essential components of all optical circuits. Since light emission from silicon is an intrinsically inefficient process, current methods for realizing laser devices in integrated optical circuits involve expensive materials (mainly III-V semiconductor compounds) and deposition technologies (MBE, CVD) that cannot be easily integrated within CMOS silicon processing fabrication line.

However, passive silicon microphotonics, comprised of photonic structures performing light-guiding, routing and processing functions, has boomed during the last ten years. A near-complete operational set of photonics devices have been demonstrated: silicon based optical waveguides with extremely low losses and small curvature radii, tunable optical filters, fast switches (ns), fast optical modulators (GHz), fast photodetectors, integrated Ge photodetectors for 1.55 µm radiation. Micromechanical MEMS system and full band-gap photonic crystals have been demonstrated while switching systems are already commercial.

In the face of this passive component integration, the primary limitation to realizing a fully autonomous IOP is an efficient active Si-based device, such as a light emitting diode (LED) or a laser light source.

Silicon is an indirect band-gap material, resulting in light emission through a low probability phonon-mediated process (spontaneous recombination lifetimes in the ms range). In standard bulk silicon, competitive non-radiative recombination rates are much higher than this radiative rate, and the majority of excited excess electron-hole pairs recombine without photon emission, thus yielding a very low internal quantum efficiency ($\eta_i \approx 10^{-6}$). In addition, fast non-radiative processes such as Auger or free carrier absorption severely prevent population inversion for silicon optical transitions at the high pumping rates needed to achieve optical amplification.

Despite of all these difficulties, during the 1990s several strategies have been investigated to cope with the intrinsically poor light emission yield of silicon.

Among the different approaches developed to overcome this material limitation, quantum confinement and rare earth doping of silicon have dominated the scientific efforts around active silicon microphotonics.

Due to the favorable modification of their optical properties, numerous silicon nanostructures, such as porous silicon, silicon nanocrystals embedded in an $SiO_2$ matrix, and $Si/SiO_2$ superlattices have been widely studied. The efficient, tunable and visible room temperature luminescence of all these structures has been ascribed to the recombination of quantum confined excitons which are self-trapped in a size dependent Si=O level at the interface between the silicon nanostructure and the $SiO_2$ matrix.

Rare earth doping studies of Erbium (Er) doped crystalline silicon have demonstrated that Er can be excited in Si through electron-hole pair recombination or through impact excitation by high energy carriers, yielding Er-doped LEDs operating at room temperature. However, a very poor quantum efficiency and high intraband absorption rules out the possibility of realizing a laser or optical amplifier with such a photonic structure.

Er-doping of glass structures reveals an ideal approach since it produces an almost temperature independent emission line originating from an internal 4-f shell transition. Even though erbium doped $SiO_2$ is used commercially to realize optical fiber amplifiers, the application of erbium-based structures in silicon microphotonics is limited so far by the small optical cross section of $Er^{3+}$ transitions, and represents one of the major challenges of silicon-based microphotonics.

Recently, erbium doping of Si nanocrystals has been recognized as a hybrid method combining the promising features of both the described methods. Indeed, it has been demonstrated that Si nanocrystals in the presence of Er act as efficient sensitizers for the light emission of the rare earth. The effective excitation cross section of erbium ions in presence of Si nanocrystals is more than two orders of magnitudes higher with respect to the resonant absorption of a photon in a silica matrix while, in addition, non radiative de-excitation processes are strongly suppressed.

Recent observations of net optical gain at 1.54 μm with enhanced erbium emission cross section in Er-doped Si nanocluster sensitized waveguides, and the demonstration of efficient room temperature electro-luminescence from Er-silicon nanocrystal devices has opened the route towards the future fabrication of Si IOP devices based on Er amplification.

Room temperature continuous wavelength lasing action in the near infra-red and visible has been demonstrated by optical pumping of microdisk structures, comprised of III-V InP based materials. Enhanced photo-luminescence from Er-doped microdisks has been observed, establishing experimental groundwork for our realization of an Er-doped microdisk laser.

In addition, the fabrication of ultra-high Q toroid Er-doped microcavity on a silicon chip and the realization of planar Er-doped silica microdisk structures with extremely smooth edges is paving the way towards the realization of low noise, CMOS compatible erbium-based micro laser devices and optical amplifiers.

SUMMARY OF THE INVENTION

According to one aspect of the invention, there is provided a microphotonic light source. The microphotonic light source includes an optical pump and a plurality of waveguides that distribute optical pump power of the optical pump. At least one Erbium-doped laser ring is coupled to at least one of the waveguides so as to match the resonance condition of the optical pump.

According to another aspect of the invention, there is provided a method of forming a microphotonic light source. The method comprises providing an optical pump and providing a plurality of waveguides that distribute optical pump power of the optical pump. Also, the method includes providing at least one Erbium-doped laser ring that is coupled to at least one of the waveguides so as to match the resonance condition of the optical pump.

DETAILED DESCRIPTION OF THE INVENTION

Figure 1:
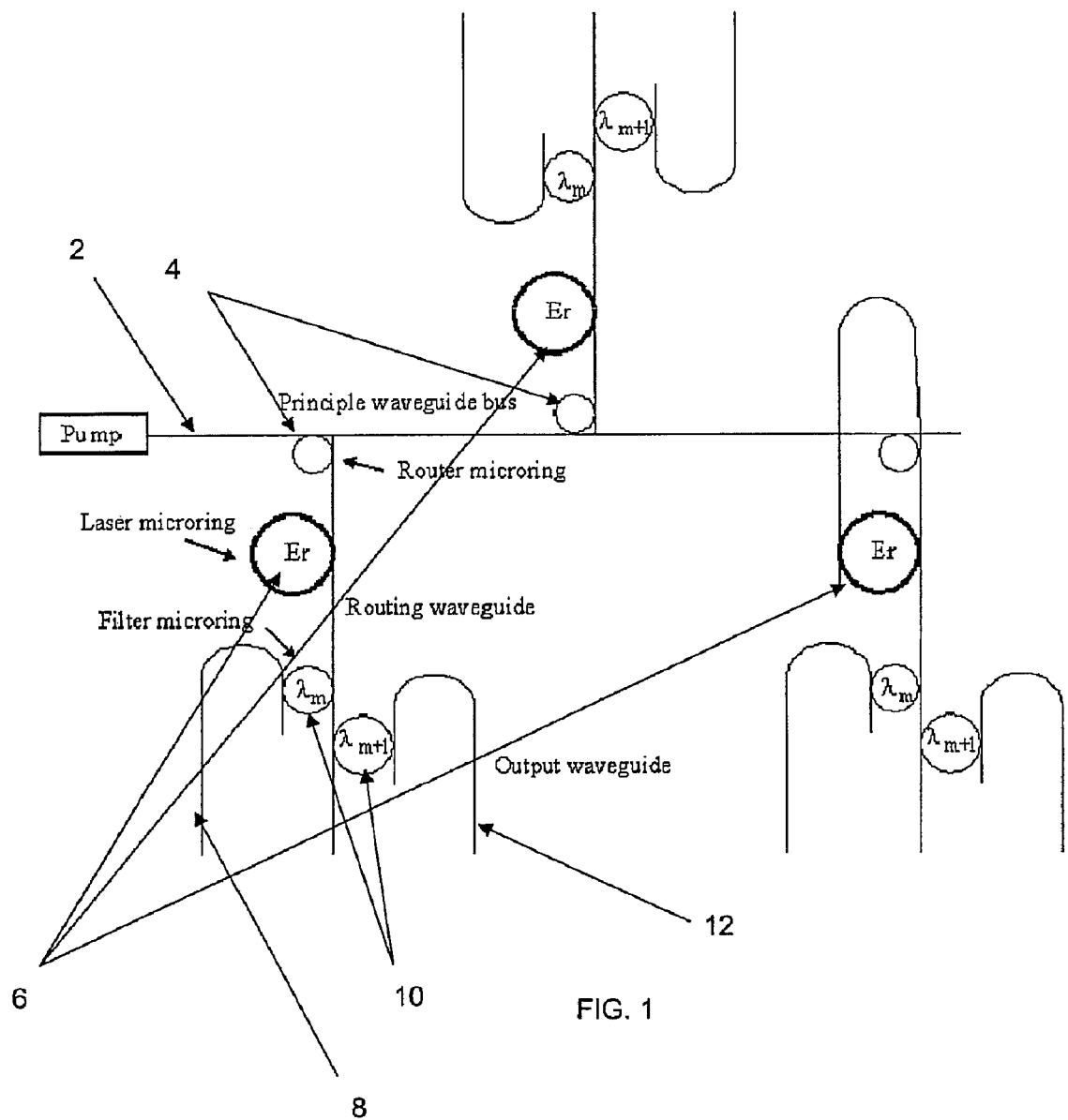
FIG. 1 is a schematic diagram illustrating a Broadband Microphotonic Light Source (BMLS) design layout.

FIG. 1 shows a Broadband Microphotonic Light Source (BMLS) that includes a multiwavelength laser source emitting within the telecommunications C-Band, around 1.55 μm, which is fully compatible with planar optical technology. In the scheme of the device, a pump laser (tunable or operating at fixed wavelength) distributes optical pump power through silicon nitride ($Si_3N_4$) or silicon oxynitride (SiON) waveguides 2 to Erbium-doped $Si_3N_4$ or SiON microring laser resonators 4 with, radial dimensions designed to match the resonance condition for both the pump and the signal wavelengths. Routing of the pump wavelength across this optical circuit is achieved by coupling the pump radiation of a (tunable) 980 nm laser source with undoped microrings or routing rings 4.

The routing rings 4 aligned along a principal input waveguide bus 2 to distribute the input pump power to regions of the optical circuit containing different radii microring lasers 6. The microring lasers 6 are optically pumped and lased at different wavelengths, as determined by their ring radii, lying within the emission spectrum of the Er atom. The device scheme is easily implemented on a silicon platform, providing an integrated and comparatively inexpensive approach towards the realization of a tunable multi-wavelength C-band (1.55 μm) laser source for silicon-based opto-electronic integrated circuits.

The invention schematically sketched in FIG. 1 includes of a planar array of Er-doped microring laser sources with multi-wavelength signal emission around the 1.55 μm region and with the option of a selective optical pump to provide an equivalent switching and routing functionality. With respect to the standard Er-doped fiber ring laser approach, the microring laser device is capable of monolithical integration with standard silicon technology and provides a route towards the achievement of very large scale integration (VLSI) in optical photonic circuits (PCs).

The invention is made of a planar multiwavelength laser source realized by coupling of Er-doped microring resonators with passive microrings of different dimensions acting as selective pump routers and signal filters, for a tunable 980 nm pump laser. The passive router microrings 4 are all aligned along a common waveguide bus 2 for the pump transmission while the active Er-doped microrings +6 are coupled with individual routing waveguides, as shown in FIG. 1. The Er-doped microrings are resonantly coupled with the signal erbium emission wavelength and with the 980 nm pump in order to enhance the pumping efficiency of the active structures through pump trapping in the active ring.

The big advantage of the Er-related gain mechanism is the strategic 1.55 μm emission combined with a flat gain spectrum, due to the inhomogeneous broadening of the erbium transitions in the host material. In principle, the tunable planar laser platform can be realized out of any broad gain material that can be optically excited. The Q factors of the individual erbium rings can be increased by selectively heating and reflowing the active rings in order to create smoother edge peripheral regions in the rings.

The planar active platform has great flexibility and can be designed in different configurations. The routing rings 4 can have different radii to allow multiple pump sources or can be all the same when the platform is intended as a selective wavelength switcher or a single pump source.

Even if the router rings 4 are resonant only at the pump wavelength, additional filtering devices 8, 10 can be needed to avoid signal back-coupling with these rings. Additional low Q filtering (Q≅500) rings 10 with resonant wavelengths $\lambda_m$ and $\lambda_{m+1}$ can be used to avoid this problem (or additional Bragg grating with high reflectance at the signal wavelength and high transmission for the pump can be utilized if necessary).

A pump recycling strategy, additional bus waveguides or drop ports 8, can be employed to get rid of back coupled pump and signal arising from the strong overcoupling regime. The platform can also be realized directly on a two dimensional hexagonal full photonic band gap structures (such as air holes in the $SiO_2$ overcladding) with a band-gap center at the signal frequency, in order to suppress stray signals from propagating into the plane of the platform and thus enhance the laser microring's Q factor (by inhibiting ring radiation loss).

Active SiON rings can be enriched by nano-silicon inclusions (through standard sputtering procedures) or silicon nanocrystals in order to take advantage from the energy transfer mechanism to erbium ions and use an enhanced erbium emission cross section to yield considerably higher gain values in the device. The pump laser can be either 980 nm or 1480 nm.

The BMLS is a single planar photonic structure that emits multiple wavelengths of laser light within the telecommunication C-band. These multiple wavelengths emerge from output planar waveguides 12, where one waveguide 12 is dedicated to each generated wavelength of laser light, as shown in FIG. 1. The value of such a multi-wavelength coherent light source is in its immediate applicability to WDM communications: integrated with external absorption modulators, this device is a multi-channel Gbit/s output transmitter, powered by a single (or a tunable) 980 nm optical pump.

For laser microrings designed with an amorphous structure, such as deposited $Si_3N_4$ or SiON, the Er atom's luminescence and gain emission spans a 100 nm range. FIG. 9 shows the room temperature photo-luminescence profile of Er in $SiO_2$, a similar such glass structure, for reference. The gain bandwidth is approximated as a spectral window comprising the majority of this luminescence, and defined to be roughly 1470-1570 nm for the $Si_3N_4$ and SiON based BMLS design.

Figure 2:
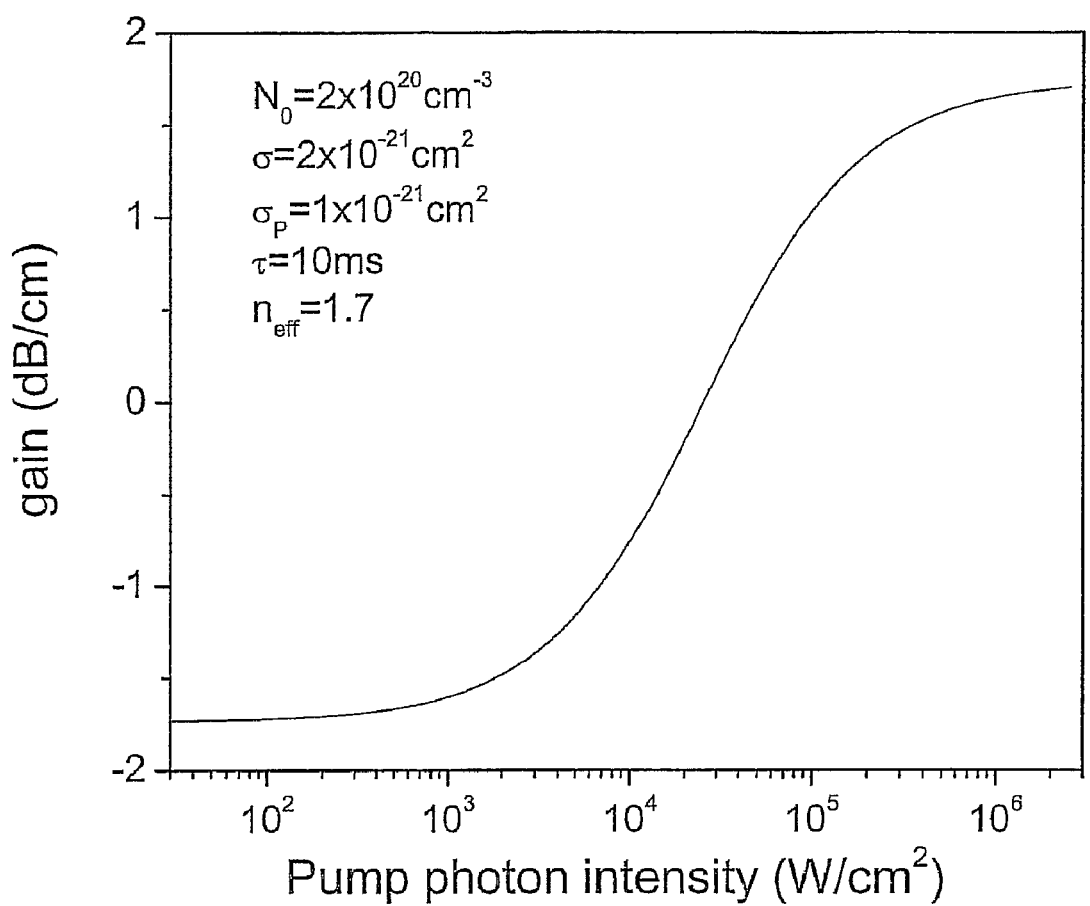
FIG. 2 is a graph demonstrating the pump intensity dependent on erbium gain coefficient.
Figure 5:
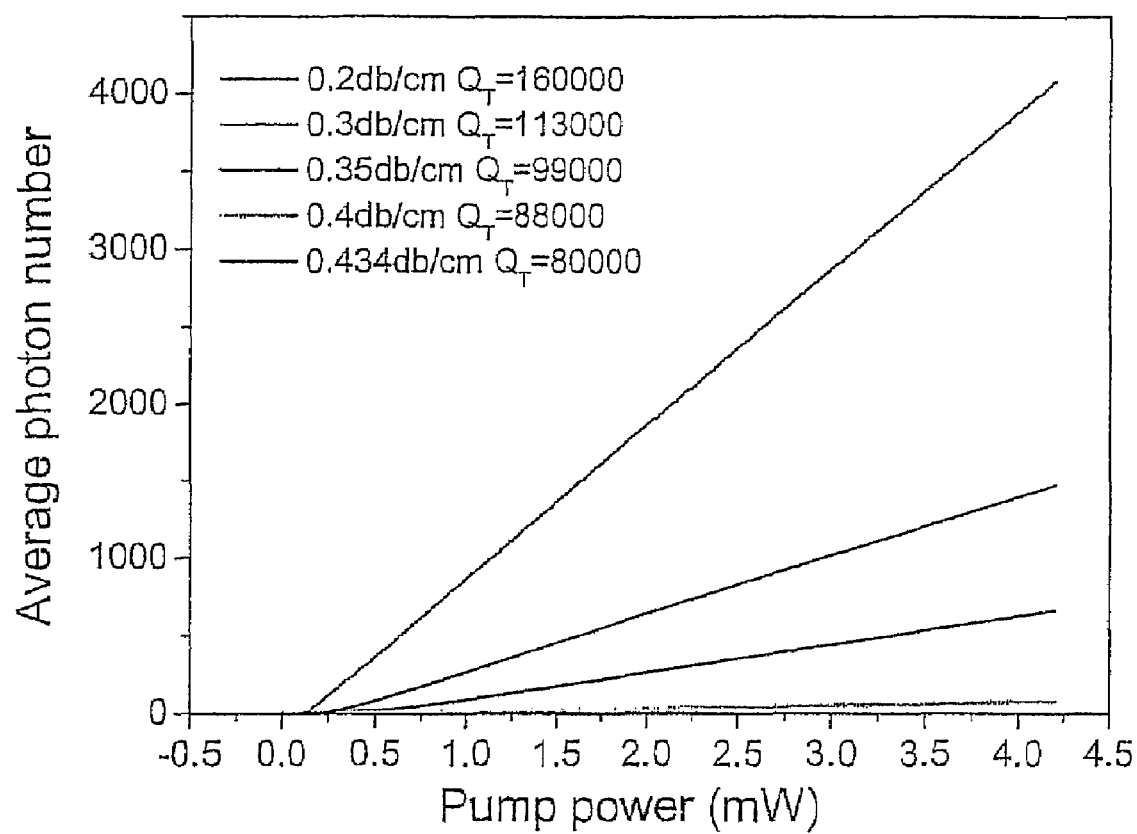
FIG. 5 is a graph demonstrating the steady state average photon number.
Figure 8:
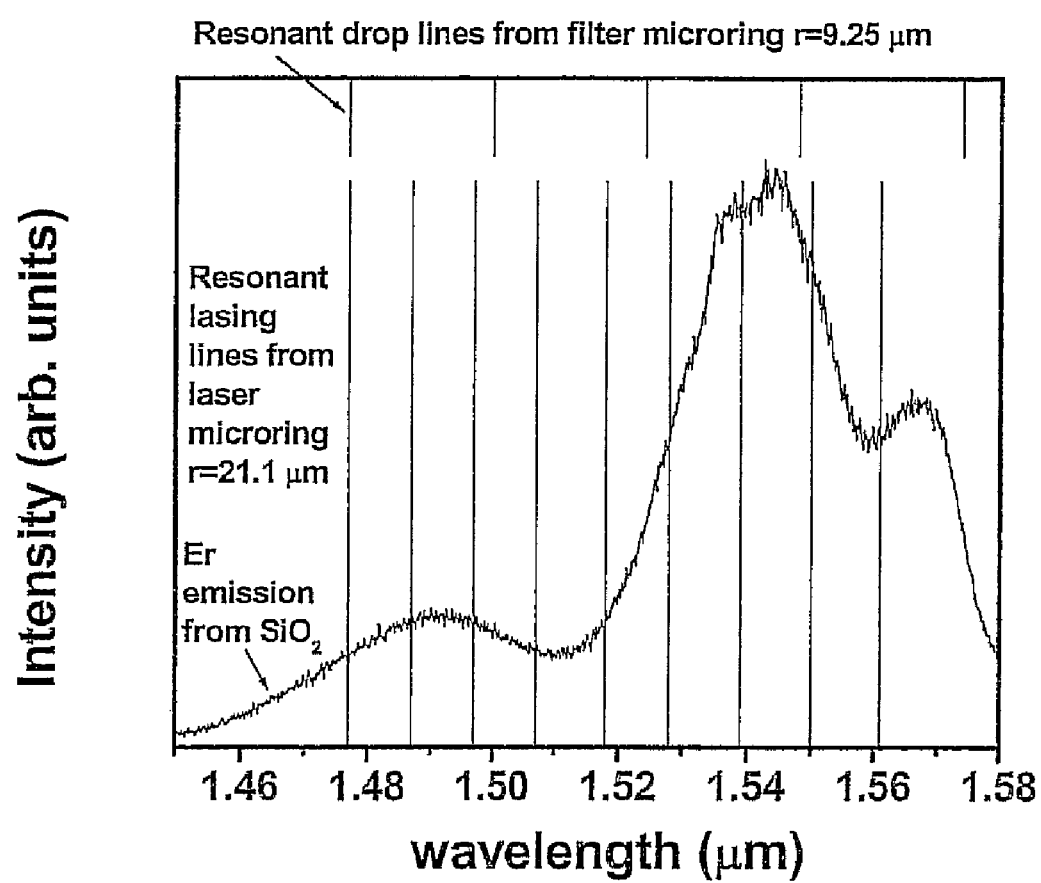
FIG. 8 is a graph demonstrating the performance of the output channels.

The three laser microrings 6 radii are chosen to resonantly trap both the optical pump wavelength (980 nm) and a lasing wavelengths that lie within this window (see Table 1). Er is a long ms-lifetime emitter, as a result of which total device quality factors Q in excess of 100 000 are required in order to achieve lasing within the laser microring, as shown in FIGS. 2 and 5. This implies the requirement of a significantly low radiative and transmission loss coefficient, below 0.1 dB/cm. The dimensions of our ring structure, as shown in Table 1, imply a minimum radius of 8 μm for design of any ring structure; in the case of the laser microring, a ring radii near 20 μm is chosen, resulting in a free spectral range (FSR) of 6.5-7 nm. For the particular case of the laser microring with radius 21.1 μm, this FSR implies the existence of nine high intensity lasing wavelengths within the 1470-1570 nm gain bandwidth, as shown in FIG. 8.

These nine high intensity lasing wavelengths propagate within the laser microring in clockwise and counter-clockwise direction, and couple to the routing waveguide in a forwards and backwards propagating direction. The backwards propagating laser wavelengths do not resonantly couple to the routing ring, and are guided to output on the side of the BMLS opposite to that for the forwards propagating laser wavelengths.

For both the forward and backward propagating laser wavelengths, filter rings selectively pick off each of the laser wavelengths from the routing waveguides, dropping each laser wavelength into on output waveguide. The smaller diameter of the filter rings (see example of filter ring with radius 9.25 μm in FIG. 1) implies a larger free spectral range (15 nm, for this particular case), which enables the filter ring to selectively pick up only one laser wavelength from the routing wavelength and drop it into the output waveguide, and not pick off any of the other eight laser wavelengths, as shown in FIG. 8. One laser microring thus generates an output of 18 light sources, made up of 9 unique laser wavelengths. With three laser microrings within our design, the BMLS emits a total of 54 laser sources, made up of 27 unique laser wavelengths, all within the telecommunication C-band.

While the Q of the laser microring must be in excess of 100 000 in order to ensure lasing action, the Q of the router microring and filter microring can be much lower, on the order of 400 to 500.

An alternative design to enhance coupling of pump power into the laser microring is detailed in FIG. 1 for one of the laser microring schematics: placing a second waveguide next to the laser microring theoretically predicts the possibility of more efficient coupling of the siphoned optical pump power into this microring. This design doubles the number of output waveguides emitting laser light and allows a simple scheme for pump photon recycling.

The BMLS is a planar structure that will be patterned in one lithographic step. The process flow requires wet thermal oxidation of 4 inch or 6 inch silicon Si wafers with 3 μm or 6 μm of silicon oxide $SiO_2$ on both sides of the wafer. This layer of $SiO_2$ acts as an optical isolator, isolating the propagating modes of our photonic structures from being evanescently coupled into the Si wafer substrate.

The micron-scale layer of $Si_3N_4$ co-doped with Er, or SiON co-doped with Er, or Si-rich $Si_3N_4$ co-doped with Er, or Si-rich SiON co-doped with Er is deposited by reactive magnetron sputtering or a combination of CVD deposition and ion implantation. The layer of Er-doped material (with an Er doping concentration of $2-4\times10^{20}$ $cm^{-3}$) is now lithographically patterned by conventional UV light source lithography (a positive photo-resist is spun onto the layer of film and the resist is exposed to UV light while under an I-line stepper mask) to design the architecture of the BMLS, as schematically shown in FIG. 1. The resulting pattern is etched into the deposited layer by reactive ion etching, and the overlying exposed photo-resist pattern is removed by plasma etching.

The resulting patterned structure is now placed under a PECVD deposition of $SiO_2$, of thickness 3 μm, and this is termed the over cladding layer of $SiO_2$. A rapid thermal anneal or longer time anneal may be required at this step, in order to optimally activate luminescence from the Er atoms, or to form an adequate number of Si-nanocrystal sensitizers.

Er is a chemical element compliant with CMOS standards of lifetime contamination for MOS devices. As such, this entire fabrication process flow is compliant with a CMOS-level clean room fabrication facility.

A major concern related to the use of erbium-doper SiON rings as active material system stems from the very low erbium emission cross section, which requires a preliminary careful design of the device structure in order to obtain the conditions for laser oscillations. Based on a simple rate equation modeling one may determine how the relevant laser parameters, such as the gain coefficient and the threshold laser quality factor Q, depend on the 980 nm pump intensity, demonstrating the feasibility of the proposed active device.

To obtain laser oscillation one need to fulfill the gain clamping condition:

$$g_{th} = \sigma \Delta N_{th} = \alpha \quad (1)$$

where $\sigma$ is the erbium emission cross section, $\Delta N_{th}$ is the population inversion density required to yield a steady state gain coefficient $g_{th}$ equal to the total (coupling or reflection+ scattering and roughness) optical losses $\alpha$.

Losses are translated into a characteristic photon escaping time $\tau$ through the device group velocity $v_g$:

$$\tau^{-1} = \alpha v_g \quad (2)$$

and substituting (2) into (1) one can express the laser threshold population inversion as:

$$\Delta N_{th} = \frac{1}{\sigma \tau v_g} \quad (3)$$

Using the general quality factor definition:

$$Q = \frac{\omega_0 \tau}{2} \quad (4)$$

where $\omega_0$ is the device operation pulsation related to the optical frequency $f = \omega_0/2\pi$. Based on the previous relations it is easy to express the threshold quality factor to the threshold inversion density:

$$Q_{th} = \frac{\omega_0}{2\sigma \Delta N_{th} v_g} \quad (5)$$

If one relates the threshold inversion level $\Delta N_{th}$ with the required pumping rate to build up such an inversion in the system, a very interesting relation expressing $Q_{th}$ versus the pumping conditions required to get laser oscillation is found.

Within a standard three level recombination scheme the steady state population inversion can be generally expressed as:

$$\Delta N = N_0 \frac{(\sigma_P \phi_P - w)}{(\sigma_P \phi_P + w + 2nB)} \quad (6)$$

where n is the number of emitted photons, B the Einstein stimulated (emission/absorption) coefficient, $\sigma_P$ is the absorption cross section at the pump wavelength, $\phi_P$ is the pump photon flux, and w is the recombination rate of the erbium excited level ($^4I_{13/2}$). Equation (6) can be easily obtained solving in the steady state the following rate equation system:

$$\frac{dN_2}{dt} = \sigma_P \phi_P N_1 - w N_2 - nB(N_2 - N_1) \quad (7)$$

$$N_0 = N_1 + N_2$$

where $N_i$ are the atomic level population densities. Considering that at the laser threshold the number of photons emitted by stimulated emission is negligible one can set $n \approx 0$ and substitute equation (6) into (5) assuming $\Delta N_{th} = \Delta N(n=0)$ to obtain the pump dependent laser quality factor Q at threshold:

$$Q_{th} = \frac{\omega_0}{2\sigma v_g} \frac{\sigma_P \phi_P + w}{N_0(\sigma_P \phi_P - w)} \quad (8)$$

where $\phi_p$ is the pump flux required to obtain the laser threshold population inversion needed to satisfy the gain clamping relation (1). A plot of relation (8) is shown in FIG. 2. The laser quality factor Q is generally related to the optical loss $\alpha$ in the system through:

$$Q = \frac{\omega_0 \tau}{2} = \frac{\omega_0}{2} \frac{1}{\alpha v_g} \quad (9)$$

In a ring resonant system the pass gain G is given by:

$$G = g l_{eff} \quad (10)$$

where g is the gain per unit length and $l_{eff}$ is an effective interaction length proportional to the quality factor Q through:

$$l_{eff} = \tau v_g = \frac{2Q v_g}{\omega_0} \quad (11)$$

Figure 4:
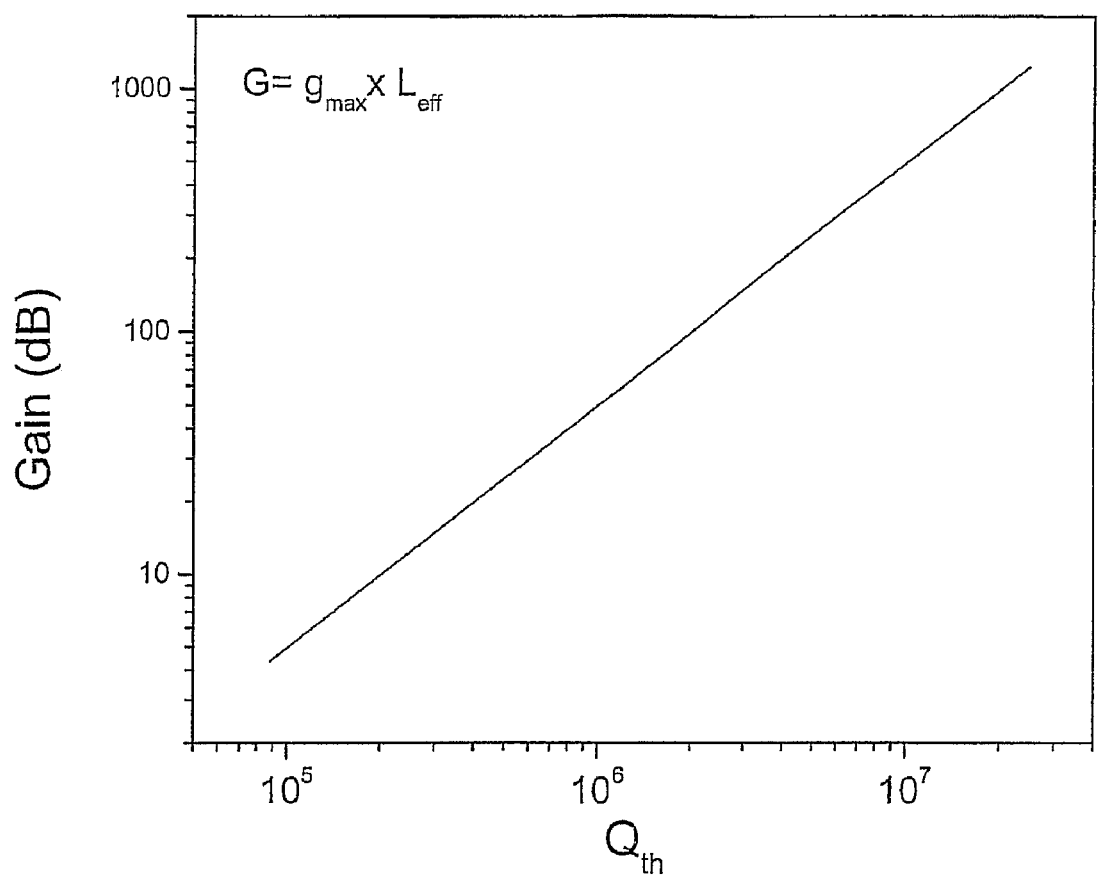
FIG. 4 is a graph demonstrating the Gain in the device versus the quality factor.

It will be appreciated that G is a linear function, as shown in FIG. 4, of the quality factor given a constant gain per unit length (determined by imposing the gain clamping condition at the operation pump power).

If the general expression $g_{th} = \sigma \Delta N_{th}$ is substituted for the threshold gain into equation (10), the obvious result obtained is:

$$G_{th} = g_{th} l_{eff} = 1 \quad (12)$$

showing that the single pass threshold gain G is independent of Q and is 1. This fact is just the expression in different words of the gain clamping condition $g_{th} = 1/l_{eff} = 1/\tau v_g = \alpha$ and represents a sound consistency check of our formalism.

In FIG. 2, the pump dependent gain coefficient obtained by solving the model rate equations at the steady state is shown. The model parameter values are reported in the FIG. 3. A maximum gain of about 2 dB/cm can be obtained at the erbium concentration considered in the model.

Figure 3:
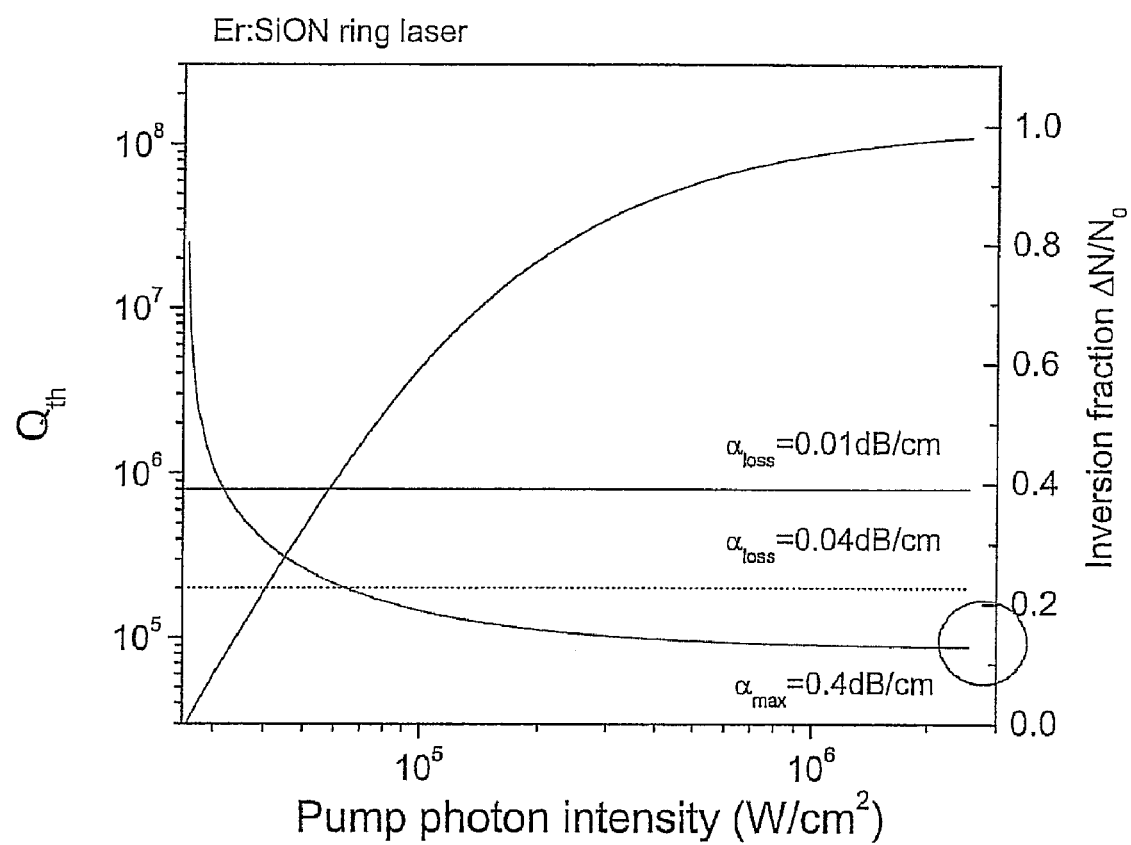
FIG. 3 is a graph demonstrating the gain-loss figure of the invention.

In FIG. 3, the threshold quality factor $Q_{th}$ is plotted versus pump intensity at 980 nm. The horizontal lines represent the loss Q factors corresponding to the optical loss (through relation 9) values indicated in the FIG. 3. In the description, laser oscillations will start at the intersection values of the horizontal lines with the red curve representing the $Q_{th}$ versus pump intensity.

On the right axis of FIG. 3 is shown the calculated inversion fraction in the system corresponding to the pump intensity at threshold. In general, to satisfy the laser oscillations condition $g_{th} \geq \alpha$ the horizontal lines corresponding to the loss values $\alpha$ have to stay on the top part of the graph with respect to the interception point with the $Q_{th}$ (related to the gain) red curve.

From this analysis it is clear that the minimum Q factor to get laser oscillation in the device has to be of the order of $10^5$ if the optical losses are as high as 0.4 dB/cm. Such Q factor values are easily achievable with our processing facilities.

FIG. 4 is a plot of the Gain in the device versus the quality factor. Gain values as high as 100 dB can be achieved for Q factors around $10^6$.

A major issue to be considered here in order to demonstrate the feasibility of laser action in the proposed device is that of the rule of bending losses.

Bending loss increases exponentially when the bending radius (ring radius) R decreases, and when the bend loss starts to increase it rises so sharply that a small change in the bend radius can have a dramatic effect on the overall loss. This reflects in the need for very accurate fabrication techniques. Here numerical estimations are performed of the optical losses and critical bending radius using the standard perturbative approach, where the zero-th order input parameters of the model comes from an equivalent straight and symmetric slab waveguide of thickness h.

The following bend-loss formula for the slab can be also applied to a two-dimensional waveguide by employing the effective index method to obtain an equivalent slab structure.

The bending loss attenuation coefficient per unit length $\alpha$ is given by:

$$\alpha = \frac{\gamma \kappa^2 e^{h\gamma} e^{-U}}{(n_{core}^2 - n_{cl}^2) k_0^2 \beta (h/2 + \gamma^{-1})} \tag{13}$$

where:

$$U = \left[ \frac{\beta}{\gamma} \ln\left( \frac{1+\gamma\beta^{-1}}{1-\gamma\beta^{-1}} \right) - 2 \right] \gamma R \tag{14}$$

where the parameters $\gamma$ and $\kappa$ are given respectively by:

$$\gamma = \sqrt{\beta^2 - k_0^2 n_{cl}^2} \tag{15}$$

$$\kappa = \sqrt{k_0^2 n_{core}^2 - \beta^2} \tag{16}$$

Figure 6:
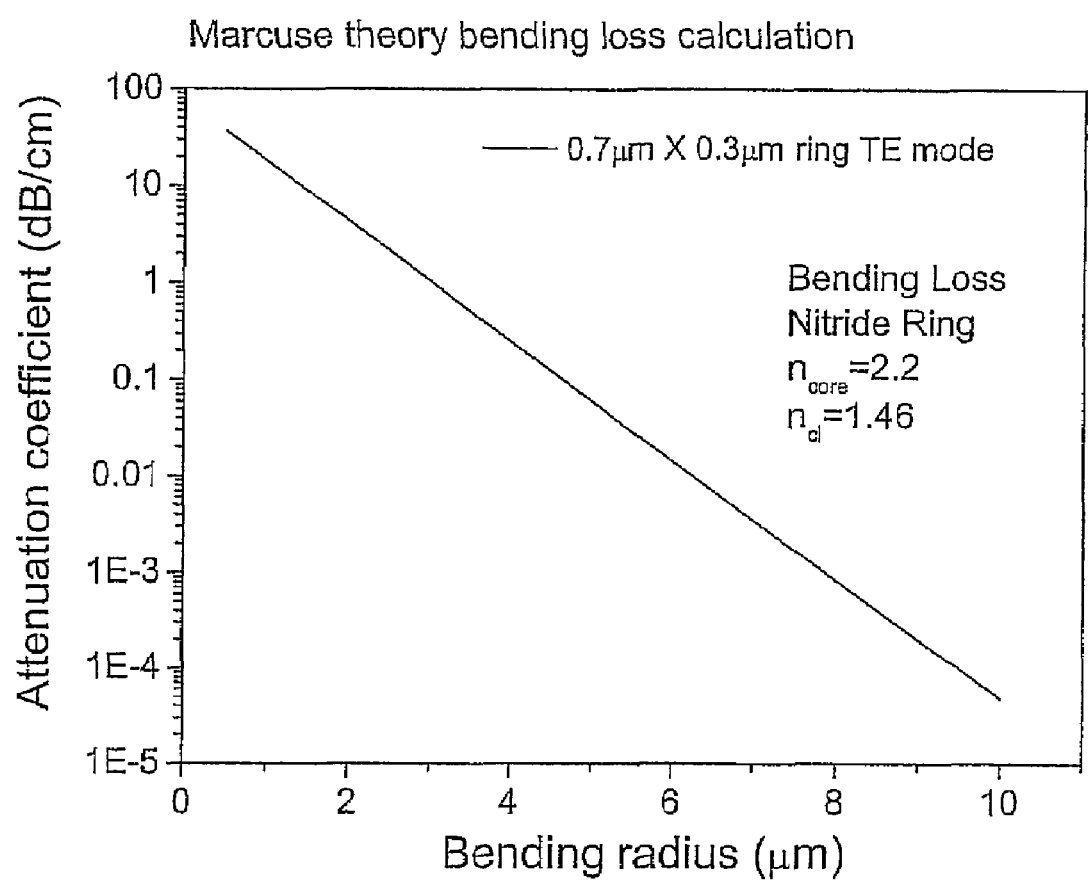
FIG. 6 is a graph demonstrating the bending attenuation factor for $Si_3N_4$:Er rings
Figure 7:
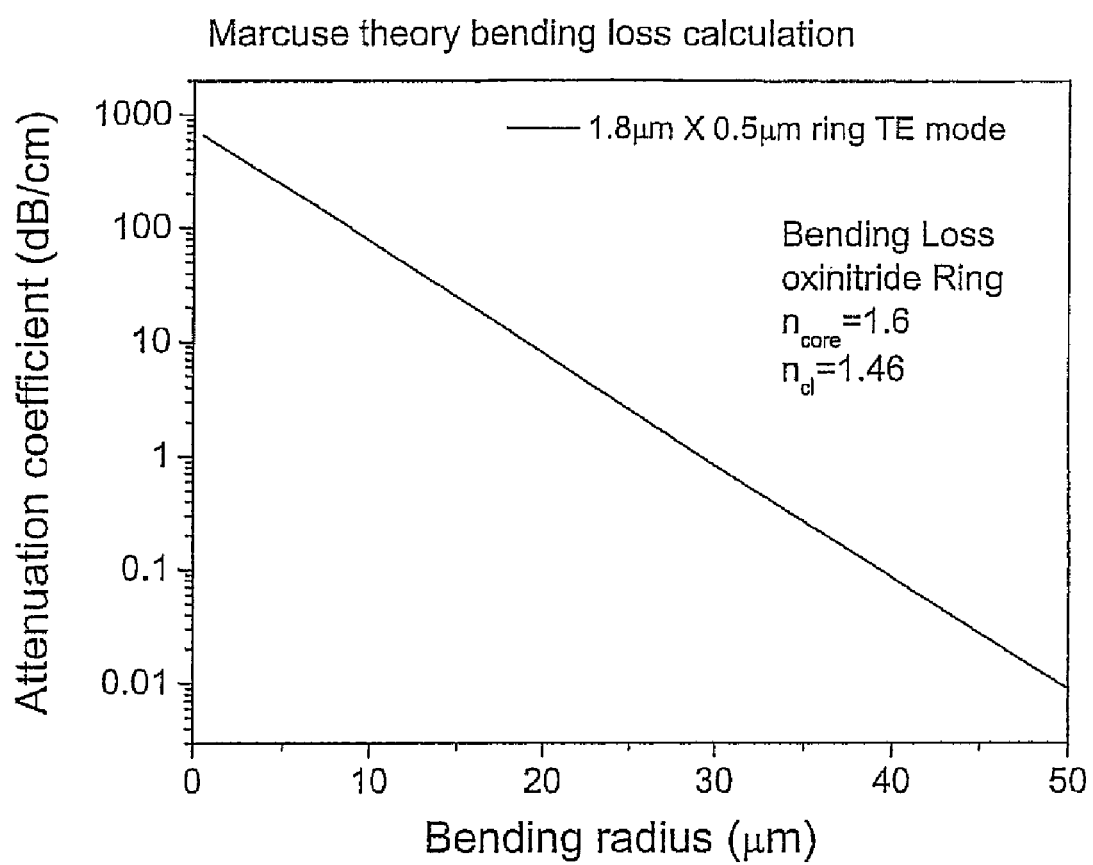
FIG. 7 is a graph demonstrating the bending attenuation factor for oxinitride:Er rings.

The bending loss estimations are shown in FIGS. 6 and 7 for the case of a $Si_3N_4$ and oxinitride Er-doper rings respectively.

The steady state average photon number in the ring can be calculated easily starting from the basic cavity rate equation:

$$\frac{dn}{dt} = v_g \sigma \frac{l}{L} (N_2 - N_1)(n+1) - \frac{l}{L} v_g g_{th} n \tag{17}$$

Equation (17) can be solved at steady state to yield:

$$\bar{n} = \frac{\sigma(N_2 - N_1)}{g_{th} - \sigma(N_2 - N_1)} \tag{18}$$

The general expression for population inversion in a three level system is:

$$\Delta N = \frac{(R-w)N_0}{R+w+2\sigma\phi} \tag{19}$$

where $R = \sigma_P \phi_P$ is the pumping rate and $\phi$ is the cavity signal photon flux.

Using the general definition of saturation photon number given by:

$$n_{sat} = \frac{P+w}{2v_g \sigma} V \tag{20}$$

where V is the cavity volume, and remembering that $\phi = n v_g / V$ one can cast the equation (19) in a simple form:

$$\Delta N = \frac{(P-w)N_0}{(P+w)\left(1 + \frac{\bar{n}}{n_{sat}}\right)} \tag{21}$$

Substituting $g_{th} = \sigma \Delta N_{th}$ into equation (18) and defining the new variables $$x = \frac{N_2 - N_1}{\Delta N_{th}} \text{ and } y = \frac{\Delta N_0}{\Delta N_{th}} \text{ (where } \Delta N_0 = \frac{(P-w)N_0}{(P+w)}\text{)}$$

is the small signal population difference), equations (18) and (21) can be written in the simpler form:

$$\bar{n} = \frac{x}{1-x} \tag{22}$$

and $$x = \frac{y}{1 + \frac{\bar{n}}{n_{sat}}} \tag{23}$$

Equations (22) and (23) can be solved simultaneously to find $\bar{n}$.

The following quadratic expression can be derived:

$$\bar{n}^2 + n_{sat}(1-y)\bar{n} - n_{sat} y = 0 \tag{24}$$

which has the solution:

$$\frac{\bar{n}}{n_{sat}} = \frac{1}{2}(y-1) + \frac{1}{2}\sqrt{(y-1)^2 + \frac{4y}{n_{sat}}} \tag{25}$$

that represents the general solution of the problem.

The average steady state photon number can be translated into a light intensity according to the relation $$I = h\nu \frac{v_g}{V} \bar{n}.$$

The simulation results corresponding to different values of the total optical losses (yielding a corresponding total quality factor $Q_T$) are shown in FIG. 5. A laser threshold of about 300 μW can be extracted for a ring structure with a quality factor in excess of $10^5$.

Although the present invention has been shown and described with respect to several preferred embodiments thereof, various changes, omissions and additions to the form and detail thereof, may be made therein, without departing from the spirit and scope of the invention.

What is claimed is:

1. A microphotonic light source comprising:
an optical pump;
a plurality of waveguides that distribute optical pump power of said optical pump, said waveguides comprising silicon nitride ($Si_3N_4$) or silicon oxynitride (SiON) waveguides;
a plurality of Erbium-doped laser ring structures that are coupled to at least one of said waveguides, each of said Erbium-doped laser rings having radial dimensions designed to match the resonance condition for both said optical pump and associated wavelengths, said Erbium-doped laser ring structures comprising Erbium-doped $Si_3N_4$ or SiON and having multi-wavelength signal emissions at approximately 1.55 μm; and
a plurality of undoped routing ring structures aligned along a principal waveguide bus to distribute the power from the optical pump to regions comprising said Erbium-doped laser ring structures; wherein
said Erbium-doped laser ring structures and said undoped routing ring structures are of varying dimensions and act as selective pump routers and signal filters.

2. The microphotonic light source of claim 1, wherein said waveguides comprise silicon nitride $Si_3N_4$.

3. The microphotonic light source of claim 1, wherein said waveguides comprise silicon oxynitride (SiON).

4. The microphotonic light source of claim 1, wherein at least one Erbium-doped laser ring comprises silicon oxynitride (SiON).

5. The microphotonic light source of claim 1, wherein at least one Erbium-doped laser ring comprises silicon nitride $Si_3N_4$.

6. The microphotonic light source of claim 1, wherein said optical pump comprises pump radiation of a 980 nm laser source.

7. The microphotonic light source of claim 1 further comprising a plurality of output planar waveguides that output each laser wavelength generated by said laser rings.

8. The microphotonic light source of claim 1 further comprising a plurality of output filter waveguides.

9. A method of forming a microphotonic light source comprising:
providing an optical pump;
providing a plurality of waveguides that distribute optical pump power of said optical pump, said waveguides comprising silicon nitride ($Si_3N_4$) or silicon oxynitride (SiON) waveguides; and
providing a plurality of Erbium-doped laser ring structures that are coupled to at least one of said waveguides, each of said Erbium-doped laser ring structures having radial dimensions designed to match the resonance condition for both said optical pump and associated wavelengths, said Erbium-doped laser ring structures comprising Erbium-doped $Si_3N_4$ or SiON and having multi-wavelength signal emissions at approximately 1.55 μm; and
providing a plurality of undoped routing ring structures aligned along a principal waveguide bus to distribute the power from said optical pump to regions comprising said Erbium-doped laser ring structures; wherein
said Erbium-doped laser ring structures and said undoped routing ring structures are of varying dimensions and act as selective pump routers and signal filters.

10. The method of claim 9, wherein said waveguides comprise silicon nitride $Si_3N_4$.

11. The method of claim 9, wherein said waveguides comprise silicon oxynitride (SiON).

12. The method of claim 9, wherein said at least one Erbium-doped laser ring comprises silicon oxynitride (SiON).

13. The method of claim 9, wherein said at least one Erbium-doped laser ring comprises silicon nitride $Si_3N_4$.

14. The method of claim 9, wherein said optical pump comprises pump radiation of a 980 nm laser source.

15. The method of claim 9 further comprising providing a plurality of output planar waveguides that output each laser wavelength generated by said laser rings.

16. The method of claim 9 further comprising providing a plurality of output filter waveguides.

* * * * *